Oct. 29, 1968 A. J. FRITZ ET AL 3,408,090

BICYCLE HAVING ADJUSTABLE HANDLEBAR AND SEAT

Filed April 4, 1966

Inventors
Albert J. Fritz
Frank P. Brilando
By Horton, Davis, Brewer & Brugman
Attys.

United States Patent Office 3,408,090
Patented Oct. 29, 1968

3,408,090
BICYCLE HAVING ADJUSTABLE HANDLEBAR AND SEAT
Albert J. Fritz, Wilmette, and Frank P. Brilando, Niles, Ill., assignors to Schwinn Bicycle Company, a corporation of Illinois
Filed Apr. 4, 1966, Ser. No. 539,779
1 Claim. (Cl. 280—278)

ABSTRACT OF THE DISCLOSURE

Bicycle having elongated saddle vertically and angularly adjustable by virtue of saddle post clamping means and clamping means pivotally mounted on rear axle frame connector plates for adjustably frictionally securing rear saddle stay means, with additional clamping means for adjustably securing high-set handlebar comprising transverse central portion with upwardly extending arms defining a main plane and the upper ends of the arms curving rearwardly and terminating in straight downwardly extending grip portions defining a plane forming forty-five degree angle with the main plane.

---

Figure 1:
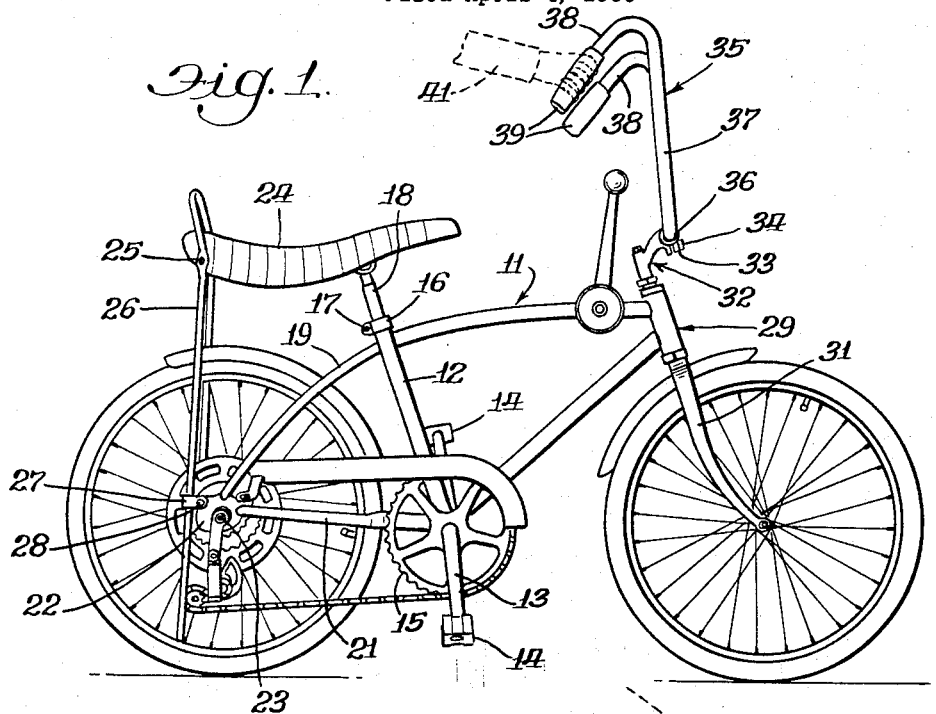

This invention relates in general to steering mechanisms, and more particularly to improvements in handlebars for bicycles, or the like.

Handlebars set high relative to the frames and normally positioned saddles of bicycles have become extremely popular, but safety authorities have determined and require that the manually engageable ends or hand grips thereof should never be positioned above the chest height of a rider seated in substantially upright position on the saddle.

With this in mind, a principal object of the invention is the provision of an improved handlebar construction which enables the same to be disposed at maximum permissible height relative to the saddle, while at the same time presenting the hand grip portions thereof in angularly disposed position to most naturally accommodate and be comfortably grasped by a rider in seated position.

Another important object is to enable the same vehicle to be ridden in maximum comfort by individuals of widely different physiques or sizes, and this is accomplished by providing novel and simplified means for mounting the saddle and handlebar for adjustment relative to the frame of the vehicle and by rearwardly curving the ends of the handlebar and terminating the same in straight manually engageable portions angularly disposed at approximately forty-five degrees relative to the main upwardly extending arms thereof so as to raise the manually engageable portions, as those handlebar arms are adjustably moved forwardly to accommodate a rider with longer arms, to always present the manually engageable portions in a position to be most comfortably grasped by a rider seated on the saddle correspondingly adjustably raised.

In this way, the further important object of the invention of increasing to a maximum the time in which a bicycle can completely satisfactorily serve a growing boy or girl is attained. With the saddle set in its lowest position to enable a child when seated thereon to comfortably actuate the foot pedals, the grip ends of the handlebar may be adjusted downwardly and rearwardly to afford maximum comfort of operation and control to that individual, and they cannot be raised adjustably above the height of the chest of the seated child. As that individual grows, only minimum efforts are required to adjustably raise the saddle to accommodate the resultingly increased leg length and to correspondingly raise and move forward the manually engageable or grip portions of the handlebar to dispose the same in position to be grasped by that individual with the wrists normally straight or forwardly extended.

Consequently, the same bicycle can be used by a child from an early age to adulthood, and adjustments of the saddle and handle bar dictated by increasing size of the individual can be accomplished with a minimum of effort and to assure the safest possible riding conditions at all times.

Another object of the invention is to simplify the mounting of an elongated saddle on a bicycle frame to facilitate angular adjustments of the slope of the saddle as well as its height.

Numerous other objects and advantages of the invention will be apparent as it is better understood from the following description, which, when taken in connection with the accompanying drawings, discloses a preferred embodiment thereof.

Figure 2:
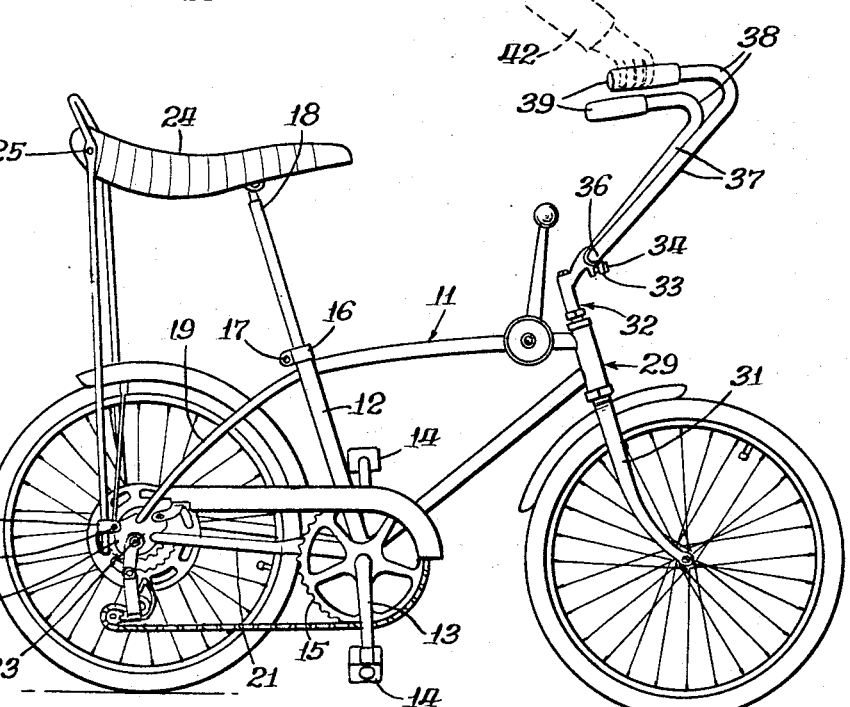

In the drawings:

FIGURE 1 is a side elevational perspective view of a bicycle embodying the features of this invention, with the saddle in a normal lowermost position and the handle bar correspondingly positioned; and FIG. 2 is a view similar to FIG. 1 showing the saddle adjusted to a normal position at maximum height and the handle bar swung forward to dispose its manually engageable portions in their uppermost position.

Referring more particularly to the drawings, the present invention is illustrated as embodied in a bicycle having a frame indicated generally by reference numeral 11. This frame includes a saddle post mast 12 secured at its lower end in well-known manner to a crank hanger for rotatably supporting a crank 13, having foot pedals 14, and a drive sprocket 15 operable thereby. The mast 12 is slotted at its upper end and has welded or otherwise secured thereto a conventional clamp 16 presenting opposed apertured ears for the reception of a bolt 17, whereby a saddle post 18 slidable in the mast 12 may be retained in any desired adjusted position.

The frame 11 also includes a rear fork made up of upper frame stays 19 and lower frame stays 21. The forward ends of the latter are secured in the usual manner to the hanger for crank 13, and the rearward ends of each pair of stays 19, 21 are secured, as by welding, to a connector plate 22 for supporting a rear axle 23.

An elongated saddle 24 is pivotally connected intermediate its ends to the upper end of the post 18 and adjacent its rear end at 25 to the legs of a substantially U-shaped saddle stay means 26. The lower end of each leg of this rear saddle stay means 26 is slidable in, and clampingly engageable by, a clamp 27 pivotally mounted on the associated connector plate 22, and rigidly securable thereto, by a suitable bolt 28.

The frame 11 further includes the usual steering head, indicated generally by reference numeral 29, and front fork 31 rotatably supported thereby. Also supported by the steering head 29 in well-known manner is the stem of a handle bar mounting unit, indicated generally by reference numeral 32, which terminates at its upper end in a forwardly extending split clamp portion 33 having the standard clamping bolt 34.

Supported by the unit 32 is a handlebar, indicated generally by reference numeral 35, comprising a main body having a central horizontally disposed portion 36 for engagement by the clamping means 33, 34, and arms 37 extending upwardly therefrom. The longitudinal center lines of the central portion 36 and the major portions of the arms 37 define the main plane of the handle bar, and each of the arms 37 curves rearwardly and terminates in a straight downwardly extending manually engageable portion 38, the longitudinal center lines of which define a downwardly and rearwardly directed plane which forms an acute angle of approximately forty-five degrees with the main plane of the handle bar. These manually engageable portions 38 preferably are provided with suitable grips 39 and diverge angularly from each other to facilitate grasping thereof by a rider.

The horizontally disposed central portion 36 of the handle bar 35 preferably is slightly enlarged and knurled to provide maximum resistance to movement when embracingly engaged by the clamping means 33, 34, but loosening of the bolt 34 allows rotation of the central portion 36 to enable the manually engageable portions 38 with their grips 39 to be raised and swung forward from their normal lowermost positions of FIG. 1 to the highest and most forwardly disposed normal positions of FIG. 2. It will be apparent that such selective positioning of the handlebar 35 provides a very wide range of distances between the saddle post 18 and the grips 39, which enables riders of widely different sizes, ranging from a small child to a large adult, to reach the handlebar comfortably and maintain proper riding position while seated, regardless of the specific style of saddle employed. In a rearward position, as in FIG. 1, the handle bar 35 permits a child with a short reach to comfortably grasp the grips 39 when seated on the saddle 24 correspondingly disposed in a lowermost position; while the raised position of the saddle and forwardly disposed position of the handle bar shown in FIG. 2 will properly accommodate a large adult. If a standard saddle requiring only the post 18 for support is employed, it is necessary only to loosen and tighten the first clamping means 33, 34 and the second clamping means 16, 17 in order to properly adjust both the handle bar and the saddle.

In addition to the operation of the first clamping means 33, 34, in order to effect appropriate or corresponding adjustments of the saddle 24 in the specific embodiment herein illustrated, it is necessary only to operate the second clamping means 16, 17 and the third clamping means 27, 28. The saddle 24 thus may be moved to its normal maximum height of FIG. 2 to accommodate a long-legged rider who will find the position of the grips 39 shown therein to be that in which they may be grasped most comfortably with the wrists normally straight or forwardly extended. Such desired positions of an operator's wrists with the saddle and handle bar disposed in the normal lowermost and uppermost positions, respectively, of FIGS. 1 and 2 are indicated therein in broken lines at 41 and 42.

In adjusting the saddle 24, the pivotal mounting of the third clamping means 27, 28 on the connector plates 22 prevents binding and enables the rear saddle stay means 26 to assume different angular positions relative to the post 18. And it also will be understood that the pivotal mounting of the saddle 24 permits further variations in its positioning and facilitates angular adjustments of the slope of the saddle, as well as its height.

The handle bar hereinbefore disclosed is peculiarly adapted for use in bicycles, and specifically those particularly designed for use throughout childhood and into the adulthood of the same individual. And it also is adapted for use on bicycles employing any type of frame and size of wheel, those herein shown in the drawings only being illustrative.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In combination with a vehicle frame having a handlebar stem with clamping means at its upper end, a handlebar, comprising a main body having a central portion for engagement by said clamping means and arms extending upwardly therefrom, the longitudinal center lines of said central portion and said arms defining a main plane, and the upper end of each of said arms curving rearwardly and terminating in a straight downwardly extending manually engageable portion, the longitudinal center lines of said manually engageable portions defining a downwardly and rearwardly directed plane which forms an acute angle of approximately forty-five degrees with said main plane, said frame including a saddle post mast, a saddle post slidably disposed in said mast, a second clamping means for retaining said post in adjusted position, and a saddle secured intermediate its ends to the upper end of said post, rear saddle stay means connected to said saddle adjacent the rear end thereof, and a third clamping means for adjustably and frictonally clampingly securing said saddle stay means to said frame, whereby appropriate adjustments of said handle bar and saddle may be effected simply by means of said three clamping means to accommodate riders of widely different sizes, said frame including connector plates for supporting a rear axle, and said third clamping means being pivotally mounted on said connector plates.

References Cited

UNITED STATES PATENTS

| D. 200,753 | 3/1965 | Ryan | 90—8 |
| 1,026,115 | 5/1912 | Palin et al. | 297—198 |
| 3,294,416 | 12/1966 | Carnielli | 280—281 X |

OTHER REFERENCES

American Bicyclist and Motorcyclist, January 1965, page 19 (I).

American Bicyclist and Motorcyclist, January 1965, page 52 (II).

American Bicyclist and Motorcyclist, February 1965, page 60 (III).

KENNETH H. BETTS, *Primary Examiner.*